United States Patent
Fischereder et al.

(10) Patent No.: US 12,151,276 B2
(45) Date of Patent: Nov. 26, 2024

(54) TOOL TRANSFER APPARATUS

(71) Applicant: TRUMPF Maschinen Austria GmbH & Co. KG., Pasching (AT)

(72) Inventors: Bernhard Fischereder, Ottnang am Hausruck (AT); Andrea Tonda Roch, Turin (IT); Giovanni Vidotto, Chieri (IT)

(73) Assignee: TRUMPF Maschinen Austria Gmbh & Co. KG, Pasching (AT)

( * ) Notice: Subject to any disclaimer, the term of this patent is extended or adjusted under 35 U.S.C. 154(b) by 695 days.

(21) Appl. No.: 17/298,739

(22) PCT Filed: Dec. 6, 2019

(86) PCT No.: PCT/AT2019/060418
§ 371 (c)(1),
(2) Date: Jun. 1, 2021

(87) PCT Pub. No.: WO2020/118326
PCT Pub. Date: Jun. 18, 2020

(65) Prior Publication Data
US 2022/0055087 A1    Feb. 24, 2022

(30) Foreign Application Priority Data
Dec. 13, 2018  (AT) .................................. 51103/2018

(51) Int. Cl.
*B21D 37/14*  (2006.01)
*B21D 5/02*   (2006.01)

(52) U.S. Cl.
CPC ............. *B21D 37/145* (2013.01); *B21D 5/02* (2013.01)

(58) Field of Classification Search
CPC ......... B21D 37/14; B21D 37/145; B21D 5/02
(Continued)

(56) References Cited

U.S. PATENT DOCUMENTS

| 4,830,337 A | 5/1989 | Ichiro et al. |
| 5,692,984 A | 12/1997 | Kayatani et al. |

(Continued)

FOREIGN PATENT DOCUMENTS

| CN | 106660094 A | 5/2017 |
| CN | 107431345 A | 12/2017 |

(Continued)

OTHER PUBLICATIONS

International Search Report in PCT/AT2019/060418, mailed Apr. 21, 2020.

*Primary Examiner* — Teresa M Ekiert
(74) *Attorney, Agent, or Firm* — Collard & Roe, P.C.

(57) ABSTRACT

A tool transfer device for displacing one or multiple tools, in particular bending tools, in a guide rail, includes: at least one longitudinal push and pull transfer device for displacing the tool(s), a channel for a supply line being formed in or on the push and pull transfer device, a receptacle including at least one, preferably spirally extending, guide for retracting the push and pull transfer device, and at least one supply line, a first section of the supply line extending in the push and pull transfer device channel. The guide includes a longitudinal opening extending along the guide extension, and a second supply line section extends outside the push and pull transfer device and the receptacle guide, and the supply line, between the first and second sections, exits the channel at an exit point arranged in the guide of the receptacle near the push and pull transfer device.

30 Claims, 4 Drawing Sheets

(58) Field of Classification Search
USPC .......................................................... 72/455
See application file for complete search history.

(56) References Cited

U.S. PATENT DOCUMENTS

| | | | |
|---|---|---|---|
| 10,399,133 B2 * | 9/2019 | Felder ................ | B23Q 11/0082 |
| 10,862,290 B2 | 12/2020 | Hermey et al. | |
| 2017/0231585 A1 | 8/2017 | Atzinger et al. | |
| 2019/0257388 A1 | 8/2019 | Theiss | |

FOREIGN PATENT DOCUMENTS

| | | | |
|---|---|---|---|
| DE | 42 29 899 A | | 3/1994 |
| DE | 20 2016 105 840 U1 | | 11/2017 |
| EP | 0 320 388 A1 | | 6/1989 |
| EP | 2 946 846 B1 | | 4/2016 |
| JP | H105-84414 U | | 11/1993 |
| JP | H06 182463 | * | 7/1994 |
| JP | H06-182463 A | | 7/1994 |
| JP | H06-71036 U | | 10/1994 |
| JP | H11-285747 A | | 10/1999 |
| JP | 2004255428 | * | 9/2004 |
| JP | 2017-516664 A | | 6/2017 |
| WO | 2018/072941 A1 | | 4/2018 |

* cited by examiner

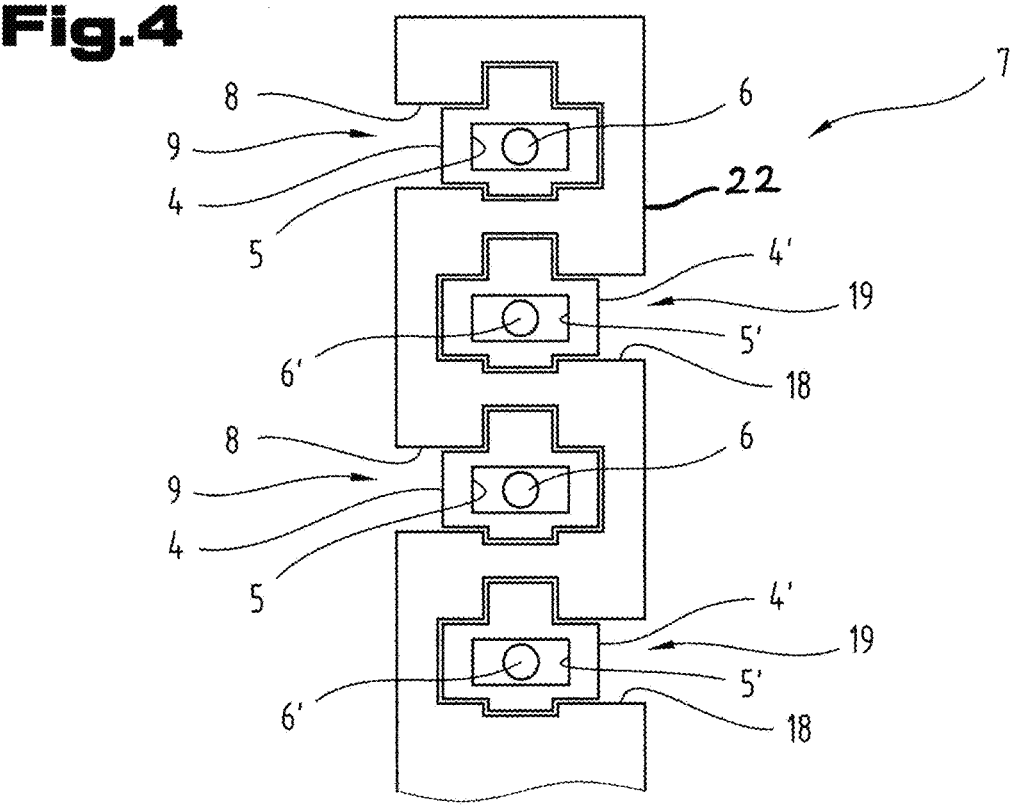
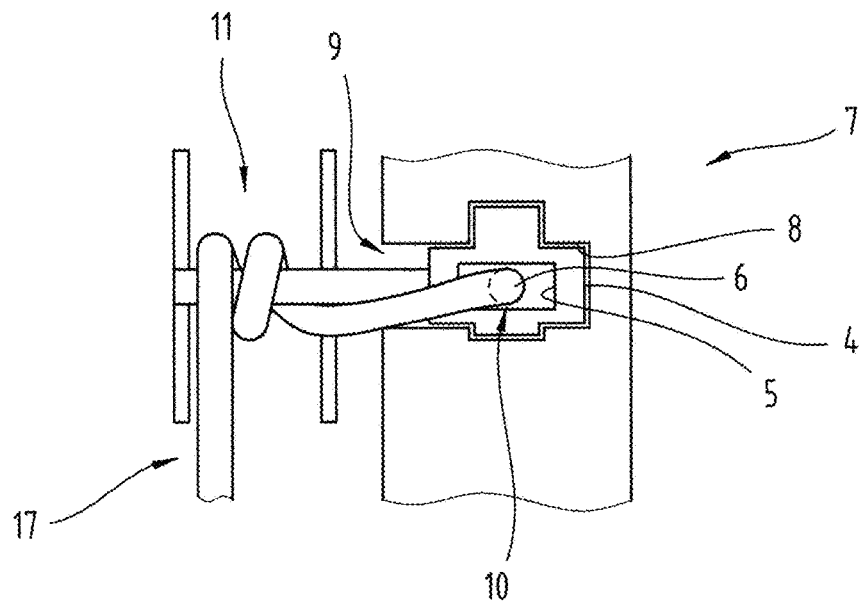

TOOL TRANSFER APPARATUS

CROSS REFERENCE TO RELATED APPLICATIONS

This application is the National Stage of PCT/AT2019/060418 filed on Dec. 6, 2019, which claims priority under 35 U.S.C. § 119 of Austrian Application No. A 51103/2018 filed on Dec. 13, 2018, the disclosure of which is incorporated by reference. The international application under PCT article 21 (2) was not published in English.

BACKGROUND OF THE INVENTION

1. Field of the Invention

The invention relates to a tool transfer device for displacing one or multiple tools, in particular bending tools, in a guide rail. The invention also relates to a tool loading device and a method for displacing one or multiple tools in a guide rail.

2. Description of the Related Art

In order to automate loading of processing machines with tools (setup, tool change, placement in a tool storage, etc.), tool transfer devices in the form of driven push-pull chains are used, which displace the tools along guides. Such push-pull chains comprise coupling devices (such as magnets, suction means, mechanical grippers, etc.) on their tool-side end, by means of which the tool is coupled to the chain. To actuate the coupling devices, it is required on the one hand to provide (electrical) energy and on the other hand to transmit control signals. The former may be solved by an electrical energy reservoir—located in the tool-remote region of the push-pull chain—; the latter may be solved by a radio link with the coupling devices.

However, it is disadvantageous that faults in the radio link repeatedly lead to failures and thus to serious errors during the setup process. Moreover, the energy reservoirs must be continuously exchanged or charged; they furthermore increase the weight and the space requirements in the region of the tool-side end of the push-pull chain.

For example, EP2946846B1 discloses a push-pull chain with an integrated line. The push-pull chain can be inserted into a receptacle with a spiral-like guide. However, EP2946846B1 does not contain any teaching on where the line runs to and/or how it is connected to the control and/or power supply. However, this object in particular poses a major problem due to the spiral-like course of the guide.

SUMMARY OF THE INVENTION

It was the object of the present invention to overcome the problems resulting from the prior art and to provide a tool transfer device by means of which a reliable supply and control of the tool-side coupling device and, where applicable, of other effectors acting on the tool. At the same time, retraction and extension of the push and pull transfer device into and/or out of the receptacle is supposed to be easy and smooth. Preferably, the fact that the guide may extend so as to be bended or spiral-like in the receptacle should be taken into account.

This object is achieved in an initially mentioned tool transfer device in that the guide, which preferably extends spirally, comprises a longitudinal opening extending along the guide extension and that a second section of the supply line extends outside the push and pull transfer device and outside the guide of the receptacle and that the supply line exits the channel between the first section and the second section at an exit point which is arranged in a region—located in the guide of the receptacle—of the push and pull transfer device.

The exit point, at which the supply line exits the channel, may be formed in the push and pull transfer device itself, preferably in the region of the tool-remote end of the push and pull transfer device. During retraction and/or extension of the push and pull transfer device, the exit point of the channel also moves along the guide. The transition region of the supply line between the first section and the second section thus also moves along the guide. The invention solves the initially mentioned problem by the supply line with its first section and/or its transition region (between the first and the second section) being moved along the guide and by the second section having a course which may to a certain extent depend on the position of the push and pull transfer device in the guide but which does no longer follow the course of the guide. Hence, partial decoupling is performed which allows for the supply line with its second section to be guided to a supply device.

The longitudinal opening may preferably be formed by the guide being open towards one side, whereby a continuous opening is present along the guide. The supply line is guided through this longitudinal opening if the channel extends in the inside of the guide. In the event that the channel is located outside of the guide (e.g. since a part of the cross section of the push and pull transfer device is not or not entirely accommodated by the guide), guiding the supply line through the longitudinal opening may be omitted.

The longitudinal push and pull transfer device is flexible; it may in particular be formed of a chain of interconnected chain links, an elastically deformable, e.g. snake-like, body or a ropelike or strap-like body.

The push and pull transfer device may comprise a shuttle and/or carriage on its tool-remote end. This may be a functional component on which, for example, a coupling device is formed for coupling one or multiple (bending) tools.

The guide of the receptacle transitions into the guide rail in which the tool(s) is/are held, such that the push and pull transfer device may pass unhindered from the guide of the receptacle into the guide rail. The guide rail in which or into which the tool(s) is/are displaced may be a tool mount of a bending press, in particular a press brake. Alternatively, the guide rail may be a guide rail or tool mount of a (bending) tool storage.

The channel may run inside the push and pull transfer device, e.g. inside the chain links, or be attached to the push and pull transfer device. The course of the channel is as flexible as the supply line (cable, pipe(s), etc.).

It is not necessary for the channel to be closed. It is sufficient for the channel to be formed for accommodating or enclosing or guiding or just holding the supply line. The term channel is therefore to be understood broadly within the meaning of the present invention.

A preferred embodiment is characterized in that the supply line exits the guide of the receptacle through the longitudinal opening between the first section and the second section, preferably in the region of the exit point. Here, the supply line exits not only (at the exit point) from the channel, but also (through the longitudinal opening) from the guide of the receptacle. This is a preferred embodiment particularly where the channel—as seen in cross section—is entirely located in the guide. The transition region (of the supply line) between the first and the second sections also moves in the longitudinal opening along the guide when the push and pull transfer device is retracted into the receptacle and/or extended out of the receptacle. In other words: the supply line is guided out of the guide (through the longitudinal opening) in a direction transverse to the guiding direction. The second section—which extends outside the channel and the guide—adjoins this transition region.

A preferred embodiment is characterized in that the exit point is arranged in the end region—which is located in the guide of the receptacle—of the push and pull transfer device. Since the end region usually does not exit the guide of the receptacle during normal operation, the exiting supply line also always remains in the region of the receptacle.

A preferred embodiment is characterized in that the second section is arranged so as to be suspended, wherein preferably the second section crosses at least one, preferably at least two, guiding section(s) of the guide (which preferably extends spirally) and/or wherein preferably the second section extends in a plane which is essentially parallel to the plane in which the guide extends. The suspended arrangement of the second section allows for the supply line section extending outside the guide of the receptacle to adapt its course to the position of the push and pull transfer device and/or the position of the exit point. The second section is preferably longer than the longest possible distance between the exit point (located in the guide) and the supply device (controller, electrical supply device and/or pressure/vacuum supply device) to which the supply line is connected.

A preferred embodiment is characterized in that the second section of the supply line—in at least one position of the push and pull transfer device—rests at least partially, preferably along at least half of its length, on a support surface.

A preferred embodiment is characterized in that the guide opens via the longitudinal opening in a direction that is transverse, preferably substantially perpendicular, to the plane in which the guide runs. The supply line thus laterally exits the guide of the receptacle.

A preferred embodiment is characterized in that the plane in which the (preferably spirally extending) guide extends is substantially vertical. This allows for space-saving placement of the push and pull transfer device in its parking position.

A preferred embodiment is characterized in that the guide comprises at least one section with a curved course, wherein the guide preferably comprises a further section with a straight, preferably horizontal, course, wherein preferably the length of the further section having a straight course amounts to at least ⅓, preferably at least ½, of the total length of the guide. At least one curved guide section is advantageous in terms of the space required. The additional provision of a straight section reduces the force required to retract the push and pull transfer device, since the resistance and/or friction is lower with straight guides and/or guide sections than with exclusively curved guides.

A preferred embodiment is characterized by the guide having a section with a spiral-like course. A guide extending in spiral-like manner makes it possible to keep the space requirement low, since the push and pull transfer device may be retracted in a confined space. At the same time, the principle according to the invention shows to particular advantage here, since undefined tangling and/or twisting is prevented even with spiral-like guides.

A preferred embodiment is characterized in that the tool transfer device, preferably in the region of the exit opening, has a roll-up device for rolling up the supply line, which moves together with the push and pull transfer device and is preferably connected to the push and pull transfer device. Particularly in case of a curved or spiral-like path, the supply line is subject to torsional forces and may twist in an undefined manner By means of the roll-up device, the possibility of rolling up the supply line in a defined way is created, when the end of the push and pull transfer device is retracted in a curved or spiral manner. The roll-up device moves along with the push and pull transfer device. The roll-up device may e.g. be connected to a chain link, preferably the last chain link, of the push and pull transfer device and/or be mounted on such a chain link. The roll-up device is preferably arranged outside the guide of the receptacle.

A preferred embodiment is characterized in that the roll-up device is provided in the form of a drum or in the form of a roller or in the form of a coil or in the form of a hub.

A preferred embodiment is characterized in that the supply line comprises a rotary joint, preferably in the form of a slip ring joint, between the first section and the second section. This is an alternative embodiment to the roll-up device which prevents rotation of the supply line, in particular of its second section. Here, the second section may be connected to the first section in such a way that the second section may be rotated against the first section in a controlled manner. The rotary joint not only defines the point at which rotation against each other takes place, but also determines the extent of the rotation due to its design.

A preferred embodiment is characterized in that the transfer device comprises a drive for driving the push and pull transfer device, wherein preferably the drive is arranged outside the receptacle.

A preferred embodiment is characterized in that the supply line comprises at least one cable and/or at least one pressure and/or vacuum line, and/or that the tool-remote end of the supply line is connected to a supply device, preferably to an electrical supply device and/or to a pressure and/or vacuum supply device. The supply device may be a controller, an electrical current and/or voltage source, a pressure or vacuum supply device.

A preferred embodiment is characterized in that the push and pull transfer device comprises, in the region of its tool-side end, a coupling device connected to the supply line for coupling a tool to the push and pull transfer device and/or an effector, connected to the supply line, for acting on a tool, in particular an adjustment device for carrying out a tool adjustment. The coupling device may be actuated between a coupling state and a released state. With the tool being coupled, it may be displaced along the guide rail and/or along the guide by moving the push and pull transfer device.

A preferred embodiment is characterized in that the push and pull transfer device is formed by a chain made of a plurality of interconnected chain links, wherein preferably the channel for the supply line runs through the chain links.

A preferred embodiment is characterized in that the exit point at which the supply line exits the channel is formed in that chain link which forms the tool-remote end of the push and pull transfer device.

A preferred embodiment is characterized by the fact that the push and pull transfer device in its cross section is completely accommodated within the guide of the receptacle. This provides the best possible protection for the push and pull transfer device and for the channel for the supply line running therein.

A preferred embodiment is characterized in that the receptacle is formed by a plate-shaped body and the (preferably spirally extending) guide runs, preferably entirely, within the plate-shaped body, wherein preferably the longitudinal opening is aligned with the surface of the plate-shaped body. This represents a space-saving and cost-effective solution.

A preferred embodiment is characterized in that the receptacle comprises a first, preferably spirally extending, guide and a second, preferably spirally extending, guide, wherein a first longitudinal push and pull transfer device, preferably for displacing upper tools, is assigned to the first guide and a second longitudinal push and pull transfer device, preferably for displacing lower tools, is assigned to the second guide. This means that the first longitudinal push and pull transfer device is retractable into the first guide and the second longitudinal push and pull transfer device is retractable into the second guide.

A preferred embodiment is characterized in that the entry into the first guide is arranged above the entry into the second guide. This corresponds to the arrangement and/or the levels as predominant, for example, in a bending press for upper tools and lower tool.

A preferred embodiment is characterized in that the first guide and the second guide are formed in a common, preferably plate-shaped, receiving body, wherein the longitudinal opening of the first guide is located on a first side of the receiving body and the longitudinal opening of the second guide is located on a second side of the receiving body, the second side being opposite to the first side. By the provision of two guides in a common receiving body, a particularly space-saving solution may be provided.

A preferred embodiment is characterized in that the windings of the first guide extend between the windings of the second guide, and/or that the windings of the first guide and the windings of the second guide at least partially overlap. Hence, the space may be used even better and the dimensions of the plate-shaped body, in particular its thickness, may be kept low.

The object is also achieved by a processing machine and/or a tool loading device for a processing machine, in particular for a bending press, having a tool transfer device according to the invention for displacing one or multiple tools, in particular bending tools, in a guide rail, in particular for transferring a tool into or out of the processing machine and/or out of or into a tool storage. In the case of a bending press, the tool mounts themselves may be designed as guide rails such that the push and pull transfer device may also enter the tool mount of the bending press and deposit or pick up tools there. The tools, in particular bending tools, comprise a holding section which projects into the guide rail (and/or tool mount) and a forming section. The push and pull transfer device is preferably guided in the same guide rail in which the tools are inserted.

A preferred embodiment is characterized in that the loading device comprises a tool storage with a plurality of storage locations for tools, in particular bending tools.

The object is also achieved with an arrangement of a processing machine and/or a tool loading device, in particular according to one of the aforementioned embodiments, and a tool transfer device according to the invention for displacing one or multiple tools, in particular bending tools, in a guide rail, in particular for transferring a tool into or out of the processing machine and/or out of or into a tool storage.

Preferably, a section of the guide extends above the processing machine and/or in the upper part of the tool loading device. Preferably, a section of the guide extends from the bottom to the top. By this measure, the push and pull transfer device is moved into an area (above the processing machine and/or in the upper part of the tool loading device) which is otherwise not used anyway. This embodiment is thus also advantageous in view of space requirements.

This object is also achieved in a method for displacing one or multiple tools, in particular bending tools, in a guide rail, in particular for transferring a tool into or out of a processing machine and/or out of or into a tool storage, characterized in that the displacement of one or multiple tools is carried out with a tool transfer device according to one aspect of the invention.

BRIEF DESCRIPTION OF THE DRAWINGS

For the purpose of better understanding of the invention, it will be elucidated in more detail by means of the figures below.

These show in a respectively very simplified schematic representation:

FIG. 4 a receptacle in the form of a plate-shaped receiving body having a first guide and a second guide;

FIG. 5 the exit point from the channel and a roll-up device for the supply line;

DETAILED DESCRIPTION OF THE PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

Finally, as a matter of form, it should be noted that for ease of understanding of the structure, elements are partially not depicted to scale and/or are enlarged and/or are reduced in size.

Despite the fact that, below, the invention is described for a bending press, in particular a press brake, the solution according to the invention is equally applicable to other processing machines in and/or to which tools may be moved via guide rails.

Figure 1:
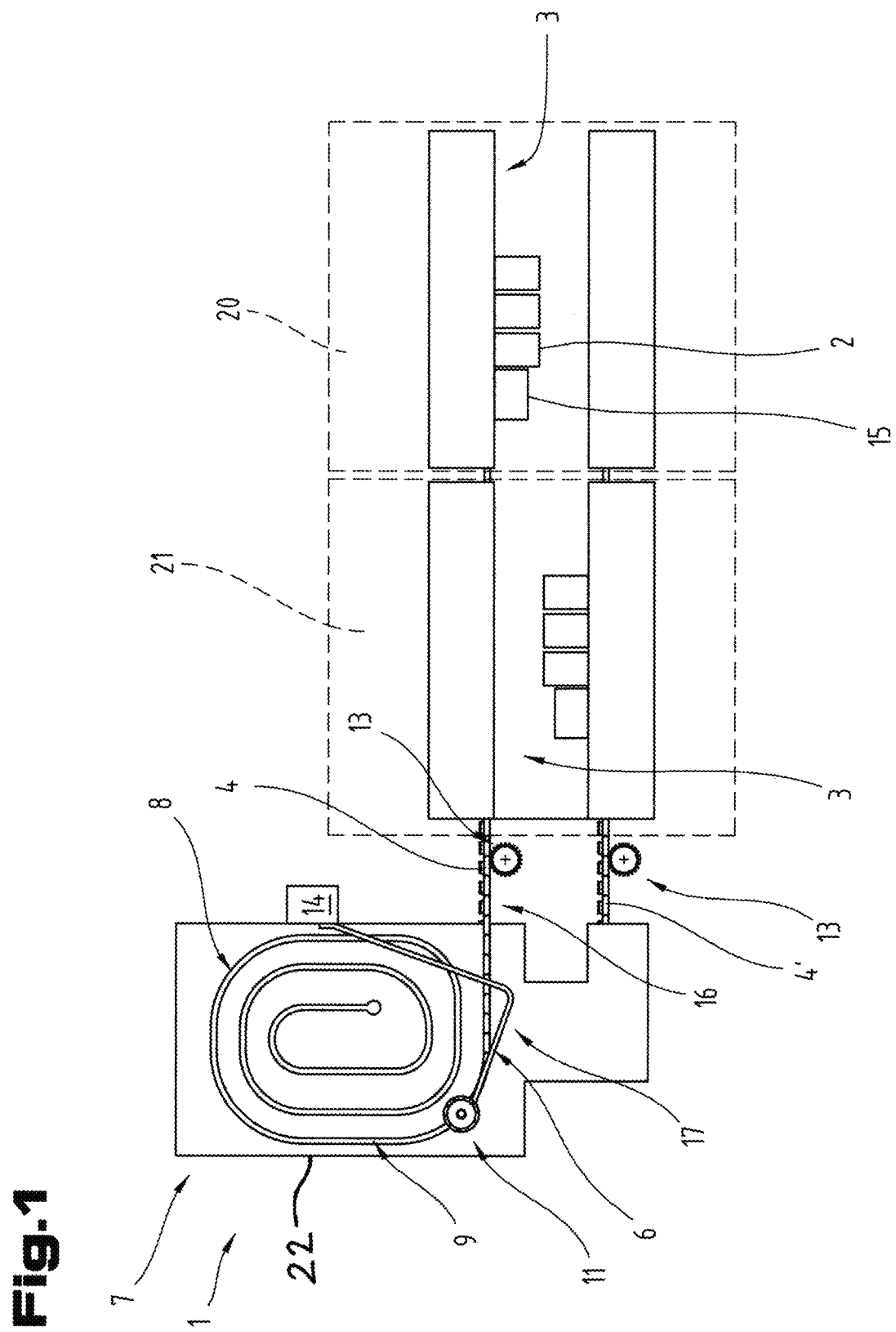
FIG. 1 a tool transfer device according to the invention which is connected to a bending tool storage and to a bending press.

FIG. 1 shows a tool transfer device 1 for displacing one or multiple tools 2, in particular bending tools, in guide rails 3. In the shown embodiment, the transfer device 1 is connected to a bending tool storage 21 and to a bending press 20. A first longitudinal push and pull transfer device 4 serves for displacing upper tools 2 (in particular punch tools). A second longitudinal push and pull transfer device 4' serves for displacing lower tools 2 (in particular die tools). The push and pull transfer devices 4, 4', which are each designed in the form of a chain here, may be displaced through the tool storage 21 and through the bending press 20 in the guide rails 3, so as to move tools with them. At this point, it should be noted that the arrangement of the bending press 20, the tool storage 21 and the transfer device 1 may in general also be different.

A channel 5, 5' for the supply line 6, 6' is in each case formed in or on the push and pull transfer device(s) 4, 4' (also see FIG. 4).

The transfer device further comprises a receptacle 7, which comprises at least one spirally extending guide 8 (here: two guides 8, 18 for the upper and lower tools) for retracting the push and pull transfer device(s) 4, 4'. The spirally extending guide 8 (and/or 18) comprises a longitudinal opening 9 (and/or 19) extending along the guide extension. The longitudinal opening is designed to be continuous along the guide and allows for lateral accessibility to the inside of the guide.

Figure 7:
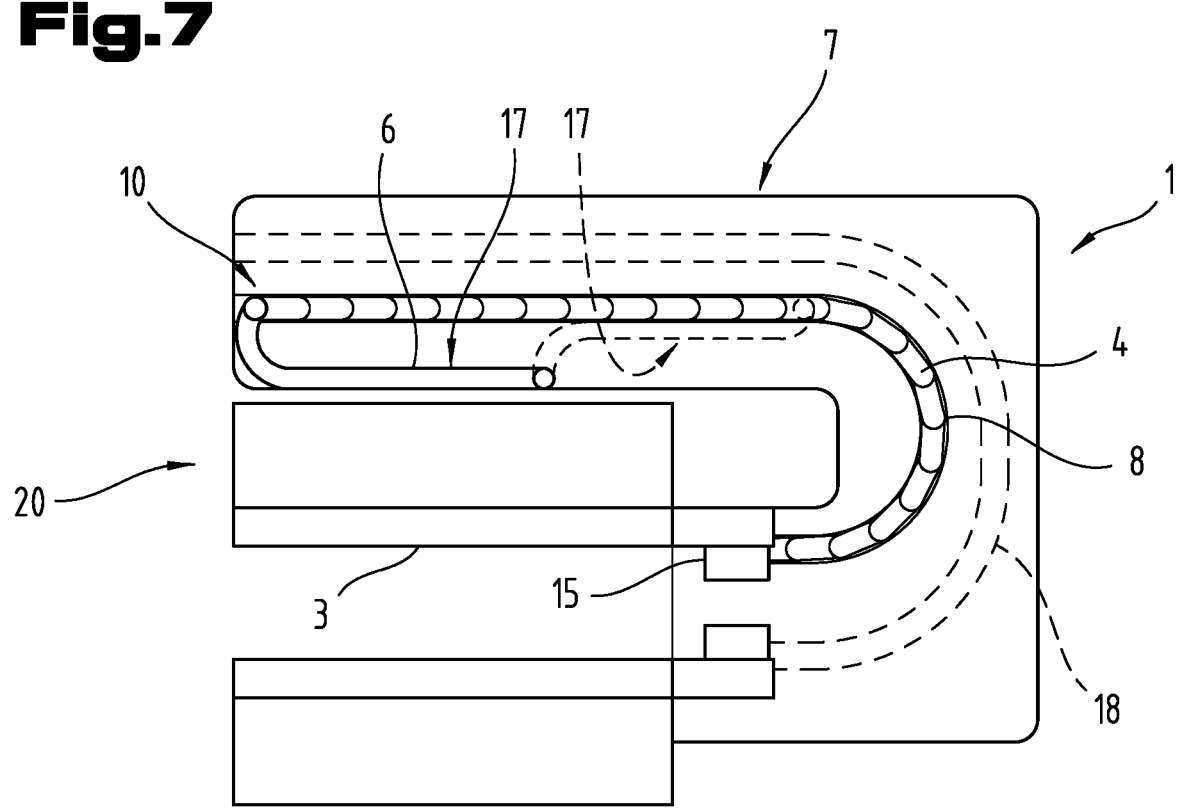
FIG. 7 an embodiment of a tool transfer device in an arrangement with a bending press.

At this point, it should be noted that the invention is not limited to spiral-like guides; rather, the principle according to the invention is equally applicable to guides which are straight or bent in another way (or have such straight/bent sections) (see e.g. FIG. 7).

A supply line 6 and/or 6' extends in the channel 5 and/or 5'. A first section 16 of a supply line 6, 6' extends in the channel 5, 5' of the push and pull transfer device 4 (and/or 4'). A second section 17 of the supply line 6 (and/or 6') extends outside the push and pull transfer device 4 and outside the guide 8.

The supply line 6 exits the channel 5 at an exit point 10 between the first section 16 and the second section 17. The exit point 10 is arranged in a region—located in the guide 8 of the receptacle 7—of the push and pull transfer device 4.

In the embodiment shown (see in particular FIGS. 1, 4 and 5), the supply line 6 exits laterally from the guide 8 through the longitudinal opening 9 between the first section 16 and the second section 17 in the region of the exit point 10. The guide 8 opens via the longitudinal opening 9 in a direction which is transverse, preferably substantially perpendicular, to the plane in which the spirally extending guide 8 runs.

In this regard, the exit point 10 is arranged in the end region—located in the guide 8—of the push and pull transfer device 4.

As can be seen from FIG. 1, the second section 17 of a supply line 6, 6' may be arranged in a suspended manner. In this regard, the second section 17 may cross at least one, preferably at least two, guide section(s) of the spirally extending guide 8 and/or extend in a plane that is substantially parallel to the plane in which the spirally extending guide 8 extends.

The receptacle 7 and/or the plane in which the spirally extending guide 8 extends is preferably substantially vertical.

Figure 2:
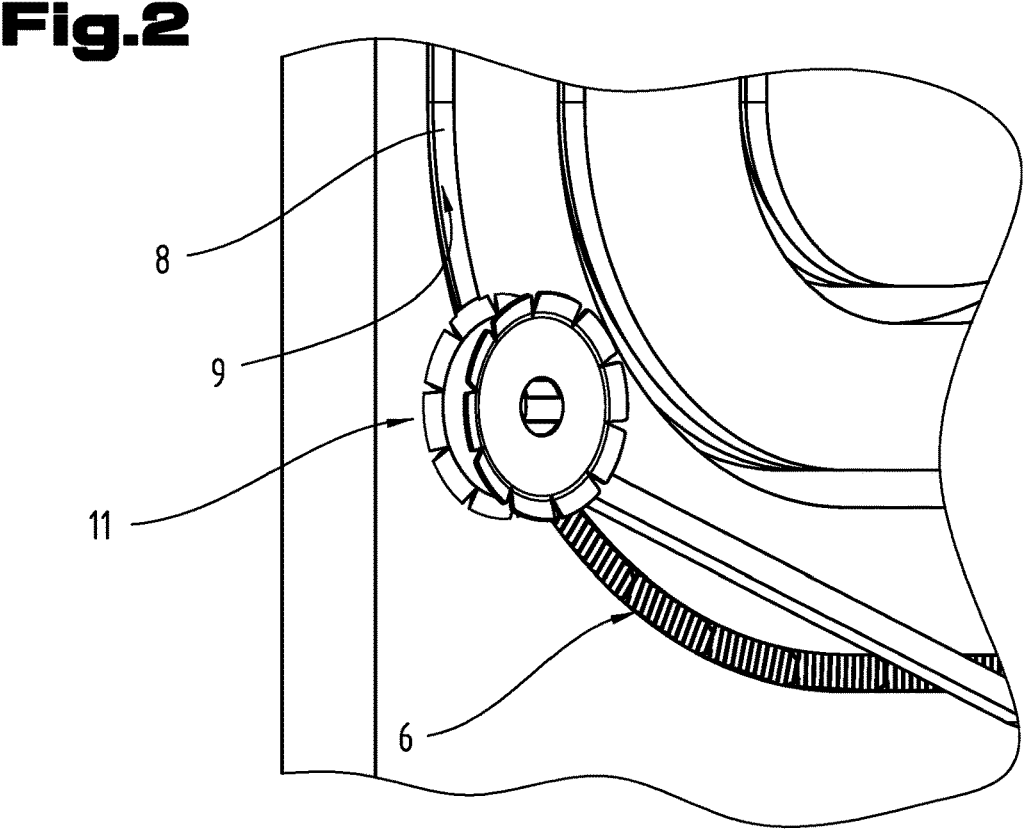
FIG. 2 a roll-up device at the tool-remote end of the push and pull transfer device.

In the embodiment of FIGS. 1, 2 and 4, the tool transfer device 1 comprises a roll-up device 11 for rolling up the supply line 6 in the region of the exit opening 10. The roll-up device 11 moves along with the push and pull transfer device 4. In the embodiment shown, the roll-up device 11 is connected to the push and pull transfer device 4 and/or mounted thereon. The roll-up device 11 may be designed in the form of a drum (see FIGS. 2 and 4) or in the form of a roller or in the form of a coil or in the form of a hub.

Figure 6:
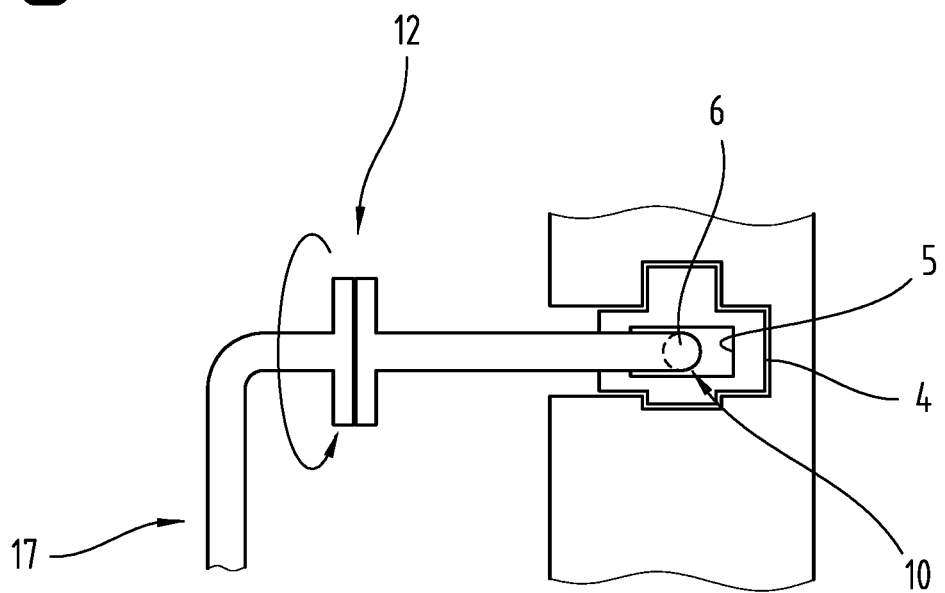
FIG. 6 a rotating installation between the first section and the second section of the supply line.

In an alternative variant shown in FIG. 6, the supply line 6 may comprise a rotary joint 12, preferably in the form of a slip ring joint, between the first section 16 and the second section 17. Hence, uncontrolled twisting of the supply line may also be prevented.

The supply line 6 may e.g. comprise an electric cable and/or a pressure and/or vacuum line. In this regard, the tool-remote end of the supply line 6 is coupled to a supply device 14 (FIG. 1), such as a controller, an electrical supply device and/or a pressure and/or vacuum supply device.

In its tool-side region, the push and pull transfer device 4 comprises a coupling device 15 connected to the supply line 6 for coupling a tool 2 to the push and pull transfer device 4. Likewise, an effector connected to the supply line 6 for acting on a tool 2, in particular an adjustment device for carrying out a tool adjustment (e.g. die width), might be provided.

It is schematically shown in FIG. 1 that the transfer device 1 comprises a drive 13 for driving the push and pull transfer device 4. In the embodiment shown, it is arranged outside the receptacle 7.

Figure 3:
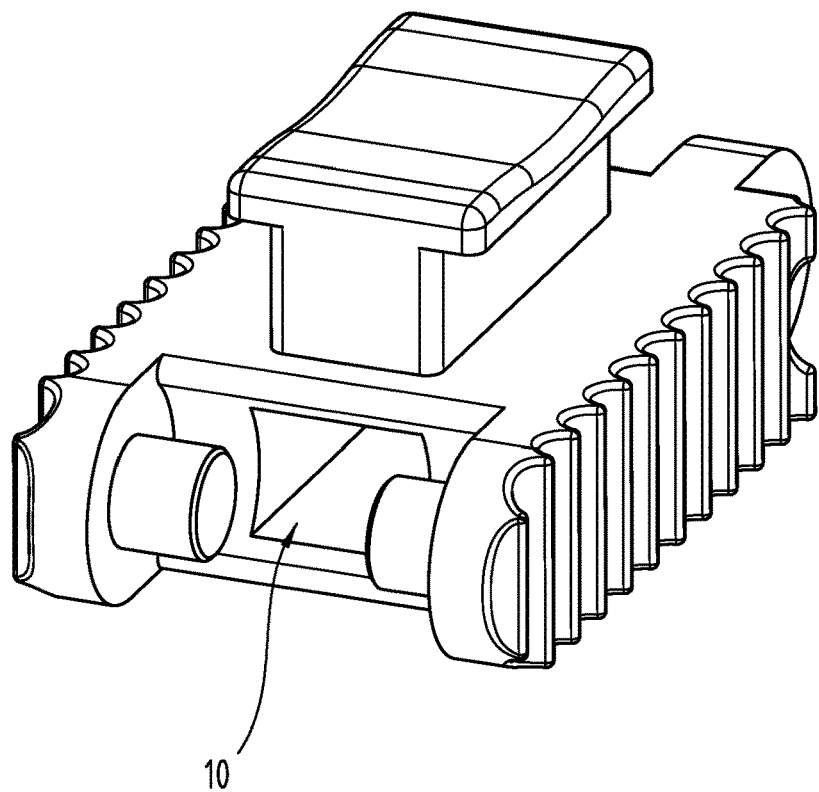
FIG. 3 a chain link for a push and pull transfer device designed as a chain.

The push and pull transfer device 4 is preferably formed by a chain made of a plurality of interconnected chain links. FIG. 3 shows an example of such a chain link. The channel for the supply line may be seen in the inside of the chain link. The exit point 10, at which the supply line 6 exits the channel 5, is preferably formed in the chain link—which forms the tool-remote end of the push and pull transfer device 4.

As can be seen from FIGS. 4 and 5, the push and pull transfer device 4 in its cross section is preferably completely accommodated within the guide 8 of the receptacle 7.

The receptacle 7—as results from FIGS. 1 and 4—may be formed by a plate-shaped body 22. The spiral-like guide 8, preferably entirely, extends within the plate-shaped body 22. In this regard, the longitudinal opening 9 may be aligned with the surface of the plate-shaped body 22.

In the embodiment shown (FIGS. 1 and 4), the receptacle 7 comprises a first spirally extending guide 8 and a second spirally extending guide 18, wherein a first longitudinal push and pull transfer device 4 (here for displacing upper tools) is assigned to the first guide 8 and a second longitudinal push and pull transfer device 4' (here for displacing lower tools) is assigned to the second guide 18.

In this regard, the entry (coming from the tool storage 21 or from the processing machine 20) into the first guide 8 is arranged above the entry into the second guide 18.

As can be seen from FIGS. 1 and 4, the first guide 8 and the second guide 18 are formed in a common, preferably plate-shaped, receiving body 22. The longitudinal opening 9 of the first guide 8 is located on a first side of the receiving body 22. The longitudinal opening 19 of the second guide 18 is located on a second side of the receiving body 22, the second side being opposite to the first side.

As can be seen from the cross-sectional view in FIG. 4, the windings of the first guide 8 may run between the windings of the second guide 18. Moreover, the windings of the first guide 8 and the windings of the second guide 18 may at least partially overlap.

FIG. 7 shows an alternative embodiment of a tool transfer device 1. It forms an arrangement together with processing machine 20 (alternatively: with a tool loading device).

In this regard, at least one section of the guide 8 extends above the processing machine 20 (and/or alternatively: in the upper part of the tool loading device). A section of the guides 8, 18 extends from bottom to top, i.e. upwards starting out from the guide rails 3 of the processing machine 20 (here the bending press).

In this regard, the guide 8 and/or 18 may have at least one section with a curved course and a further section with a straight (here: horizontal) course, wherein preferably the length of the further section having a straight course amounts to at least ⅓, preferably at least ½, of the total length of the guide 8. The guides 8, 18 open towards different sides, similarly as shown in FIG. 4 (which is why the second guide 18 is shown merely in dashed lines). In this regard, the supply line 6 rests on a support surface with its second section 17. FIG. 7 shows the supply line 6 (and/or its second section 17) in the fully retracted state of the push and pull transfer device 4. The location of the second section 17 of the supply line 6 in the retracted state of the push and pull transfer device 4 is shown in dashed lines.

The invention also relates to a tool loading device for a processing machine 20 (here: a bending press) having a tool transfer device 1 for displacing one or multiple tools 2, in particular bending tools, in a guide rail 3. This serves in particular for transferring a tool 2 into or out of the processing machine 20 and/or out of or into a tool storage 21. In this regard, the tool storage 21 may be integrated in the loading device. The tool storage 21 comprises a plurality of storage locations for tools 2.

Lastly, the invention also relates to a method for displacing one or multiple tools 2, in particular bending tools, in a guide rail 3, in particular for transferring a tool 2 into or out of a processing machine 20 and/or out of or into a tool storage 21 with a tool transfer device 1 (see FIG. 1).

LIST OF REFERENCE NUMBERS

1 Tool transfer device
2 Tool
3 Guide rail
4, 4' Push and pull transfer device
5, 5' Channel
6, 6' Supply line
7 Receptacle
8 Guide
9 Longitudinal opening
10 Exit point
11 Roll-up device
12 Rotary joint
13 Drive
14 Supply device
15 Coupling device
16 First section
17 Second section
18 Second guide
19 Longitudinal opening
20 Processing machine
21 Tool storage

The invention claimed is:

1. A tool transfer device (1) for displacing one or multiple tools (2) in a guide rail (3), comprising:
at least one supply line (6, 6'),
at least one longitudinal push and pull transfer device (4, 4') for displacing the tool(s) (2), wherein the push and pull transfer device (4, 4') comprises a tool-side end and a tool-remote end and wherein a channel (5, 5') for the at least one supply line (6, 6') is formed in or on the push and pull transfer device (4, 4'),
a receptacle (7), which comprises at least one, preferably spirally extending, guide (8, 18) for retracting the push and pull transfer device (4, 4'),
wherein a first section (16) of the supply line (6, 6') extends in the channel (5, 5') of the push and pull transfer device (4, 4'),
wherein the at least one guide (8, 18) of the receptacle (7) comprises a guide extension and a longitudinal opening (9, 19) extending along the guide extension, and
wherein a second section (17) of the supply line (6, 6') extends outside the push and pull transfer device (4, 4') and outside the guide (8, 18) of the receptacle (7), and the supply line (6, 6'), between the first section (16) and the second section (17), exits the channel (5, 5') at an exit point (10) arranged in a region of the push and pull transfer device (4, 4') located in the guide (8, 18) of the receptacle (7),
wherein the push and pull transfer device (4) comprises, in a region of the tool-side end, a coupling device (15) connected to the supply line (6) for coupling the one or multiple tools (2) to the push and pull transfer device (4) and/or an effector, connected to the supply line (6), for acting on the one or the multiple tools (2), and
wherein the exit point (10), at which the supply line (6, 6') exits from the channel (5, 5'), is formed in the push and pull transfer device (4, 4') in a region of the tool-remote end of the push and pull transfer device (4, 4').

2. The tool transfer device according to claim 1, wherein the supply line (6), between the first section (16) and the second section (17), exits the guide (8) of the receptacle (7) through the longitudinal opening (9).

3. The tool transfer device according to claim 1, wherein the exit point (10) is arranged in the end region—which is located in the guide (8) of the receptacle (7)—of the push and pull transfer device (4).

4. The tool transfer device according to claim 1, wherein the second section (17) is arranged so as to be suspended.

5. The tool transfer device according to claim 4,
wherein the second section (17) crosses at least one guiding section of the guide (8) and/or
wherein the second section (17) extends in a plane which is essentially parallel to the plane in which the guide (8) extends.

6. The tool transfer device according to claim 1, wherein the second section (17) of the supply line (6, 6')—in at least one position of the push and pull transfer device (4, 4')—rests at least partially on a support surface.

7. The tool transfer device according to claim 1, wherein the guide (8) opens via the longitudinal opening (9) in a direction that is transverse to the plane in which the guide (8) runs.

8. The tool transfer device according to claim 1, wherein the plane, in which the guide (8) extends, is essentially vertical.

9. The tool transfer device according to claim 1, wherein the guide (8) comprises at least one section with a curved course, wherein the guide (8) comprises a further section with a straight course, wherein the length of the further section having the straight course amounts to at least $\sqrt{1/3}$ of the total length of the guide (8).

10. The tool transfer device according to claim 1, wherein the guide (8) comprises a section with spiral-like course.

11. The tool transfer device according to claim 1, wherein the tool transfer device (1) has a roll-up device (11) for rolling up the supply line (6), which moves together with the push and pull transfer device (4) and is connected to the push and pull transfer device (4).

12. The tool transfer device according to claim 11, wherein the roll-up device (11) is provided in the form of a drum or in the form of a roller or in the form of a coil or in the form of a hub.

13. The tool transfer device according to claim 11, wherein the roll-up device (11) is in the region of the exit opening (10).

14. The tool transfer device according to claim 1, wherein the supply line (6) comprises a rotary joint (12) between the first section (16) and the second section (17).

15. The tool transfer device according to claim 1, wherein the transfer device (1) comprises a drive (13) for driving the push and pull transfer device (4).

16. The tool transfer device according to claim 1, wherein
  the supply line (6) comprises at least one cable and/or at least one pressure and/or vacuum line, and/or
  the tool-remote end of the supply line (6) is coupled to a supply device (14).

17. The tool transfer device according to claim 1, wherein the push and pull transfer device (4) is formed by a chain made of a plurality of inter-connected chain links, wherein the channel (5) for the supply line (6) runs through the chain links.

18. The tool-transfer device according to claim 17, wherein the exit point (10) at which the supply line (6) exits the channel (5) is formed in that chain link which forms the tool-remote end of the push and pull transfer device (4).

19. The tool transfer device according to claim 1, wherein the push and pull transfer device (4) in a cross section of the push and pull transfer device (4) is completely accommodated within the guide (8) of the receptacle (7).

20. The tool transfer device according to claim 1, wherein the receptacle (7) is formed by a plate-shaped body and the guide (8) runs within the plate-shaped body.

21. The tool transfer device according to claim 1, wherein the receptacle (7) comprises a first guide (8) and a second guide (18), wherein a first longitudinal push and pull transfer device (4) is assigned to the first guide (8) and a second longitudinal push and pull transfer device (4') is assigned to the second guide (18).

22. The tool transfer device according to claim 21, wherein the entry into the first guide (8) is arranged above the entry into the second guide (18).

23. The tool transfer device according to claim 21, wherein the first guide (8) and the second guide (18) are formed in a common receiving body, wherein the longitudinal opening (9) of the first guide (8) is located on a first side of the receiving body and the longitudinal opening (19) of the second guide (18) is located on a second side of the receiving body, the second side being opposite to the first side.

24. The tool transfer device according to claim 1, wherein
  the windings of the first guide (8) extend between the windings of the second guide (18), and/or
  the windings of the first guide (8) and the windings of the second guide (18) at least partially overlap.

25. A processing machine (20) and/or a tool loading device for a processing machine (20) having the tool transfer device (1) according to claim 1 for transferring the one or multiple tools (2) into or out of the processing machine (20) and/or out of or into a tool storage (21).

26. The processing machine and/or tool loading device according to claim 25, wherein the tool loading device comprises a tool storage (21) with a plurality of storage locations for tools (2).

27. The processing machine and/or tool loading device according to claim 25, wherein at least one section of the guide (8) extends above the processing machine (20) and/or in an upper part of the tool loading device and/or wherein a section of the guide (8) extends from bottom to top.

28. The processing machine and/or tool loading device according to claim 25, wherein the processing machine (20) is a bending press and the one or multiple tools (2) are bending tools.

29. A method comprising:
  providing the tool transfer device (1) according to claim 1, and
  using the tool transfer device (1) to transfer the one or multiple tools (2) in the guide rail (3) into or out of a processing machine (20) and/or out of or into a tool storage (21).

30. The tool transfer device according to claim 1, wherein the one or multiple tools (2) are bending tools.

* * * * *

UNITED STATES PATENT AND TRADEMARK OFFICE
CERTIFICATE OF CORRECTION

| | |
|---|---|
| PATENT NO. | : 12,151,276 B2 |
| APPLICATION NO. | : 17/298739 |
| DATED | : November 26, 2024 |
| INVENTOR(S) | : Bernhard Fischereder et al. |

It is certified that error appears in the above-identified patent and that said Letters Patent is hereby corrected as shown below:

On the Title Page

Item (73): please change: "Gmbh" to correctly read: -- GmbH --

In the Claims

In Claim 1, Lines 10-11 (Column 10, Lines 11-12): after "one" please delete ", preferably spirally extending,"

In Claim 1, Line 18 (Column 10, Line 19): please delete "and"

In Claim 9, Line 5 (Column 11, Line 3): please change "" to correctly read: -- 1/3 --

Signed and Sealed this
Twenty-fourth Day of December, 2024

Derrick Brent
*Acting Director of the United States Patent and Trademark Office*